Aug. 20, 1946.  T. G. LINNERT  2,406,233
AIRPLANE CONTROL SURFACE LOCKING MEANS
Filed June 30, 1944  3 Sheets-Sheet 1
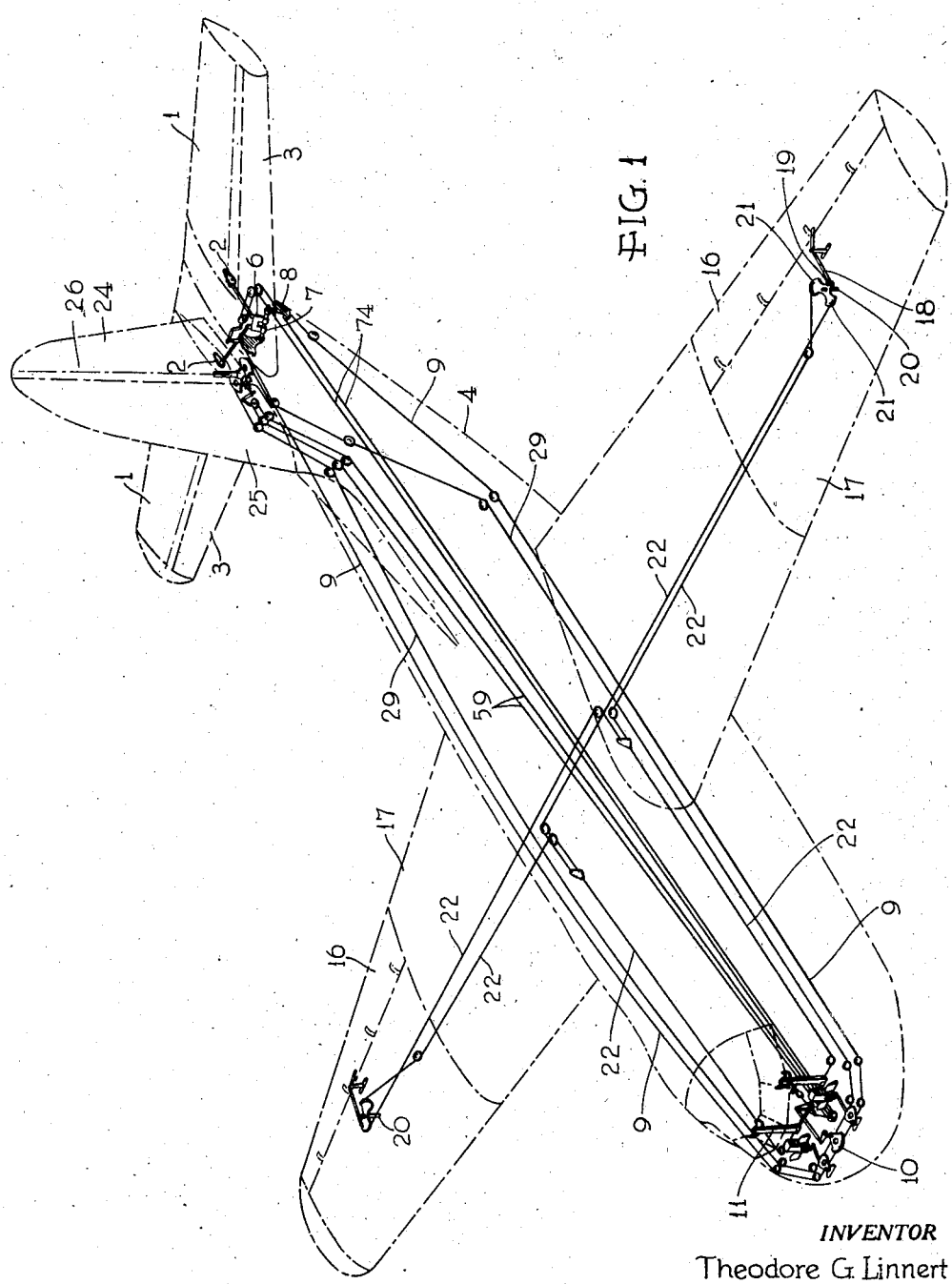
INVENTOR
Theodore G. Linnert
BY John P. Tarbox
ATTORNEY Aug. 20, 1946.         T. G. LINNERT                2,406,233
              AIRPLANE CONTROL SURFACE LOCKING MEANS
                   Filed June 30, 1944        3 Sheets-Sheet 2

INVENTOR
Theodore G. Linnert
BY John P. Tarbox
ATTORNEY

Aug. 20, 1946. T. G. LINNERT 2,406,233
AIRPLANE CONTROL SURFACE LOCKING MEANS
Filed June 30, 1944 3 Sheets-Sheet 3
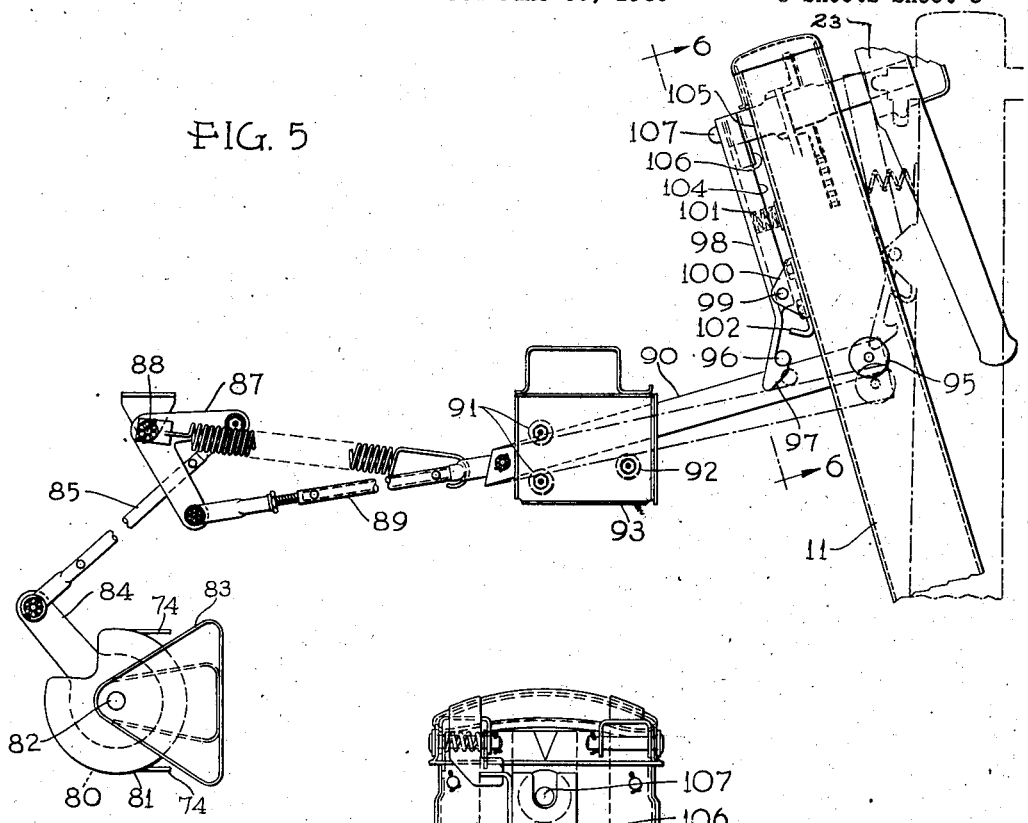
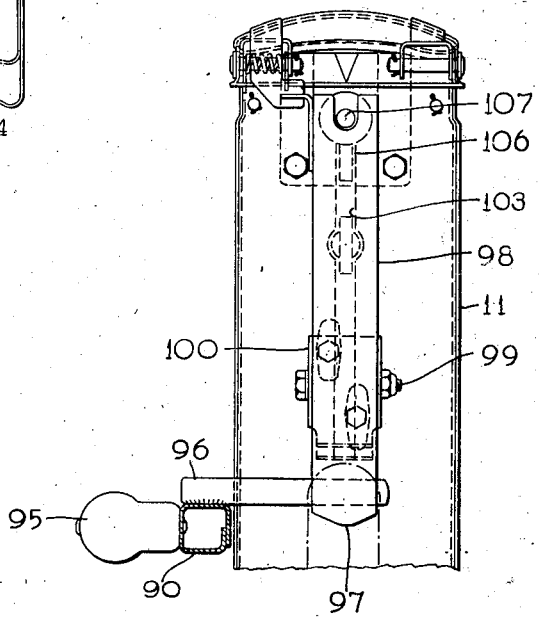
INVENTOR
Theodore G. Linnert
BY John P. Tarbox
ATTORNEY Patented Aug. 20, 1946

2,406,233

UNITED STATES PATENT OFFICE 2,406,233

AIRPLANE CONTROL SURFACE LOCKING MEANS

Theodore G. Linnert, Philadelphia, Pa., assignor to The Budd Company, Philadelphia, Pa., a corporation of Pennsylvania Application June 30, 1944, Serial No. 542,872

6 Claims. (Cl. 244—83)

This invention relates to airplane control surface locking mechanism and has for an object the provision of improvements in this art.

One of the particular objects of the invention is to provide locking mechanism for the tail control surfaces of an airplane which is interlocked with the operating mechanism of these control surfaces to assure that the control surfaces are in proper position before they can be locked and to assure that they are unlocked before the airplane can be flown.

Another object is to provide simple and effective locking and interlocking mechanism.

The above and other objects and advantages of the invention will be apparent from the following description of an exemplary embodiment which is shown in the accompanying drawings, wherein:

Figure 1 is an isometric diagram of an airplane embodying the invention;

Figure 5 is a side elevation of the interlocking mechanism; and

Figure 6 is a section and elevation taken on the line 6—6 of Figure 5.

Figure 3:
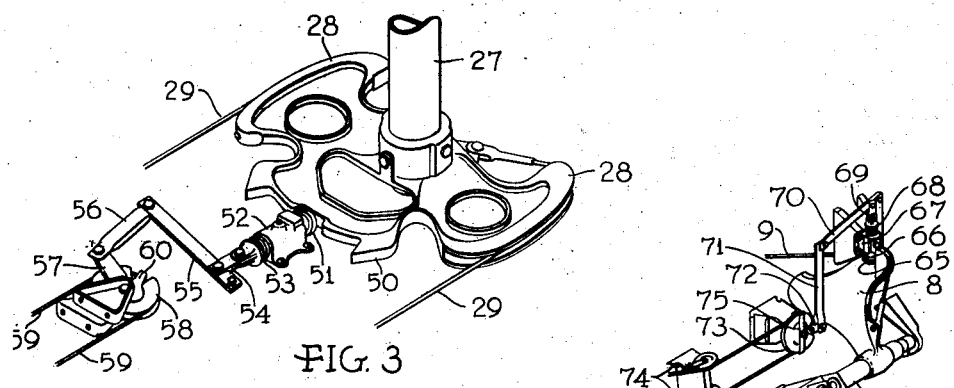
Figure 3 is an enlarged isometric diagram of the rudder operating and locking mechanism.
Figure 4:
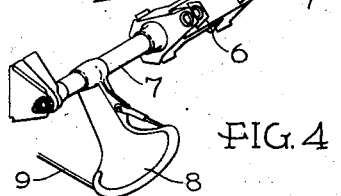
Figure 4 is an enlarged isometric diagram of the elevator operating and locking mechanism.
Figure 2:
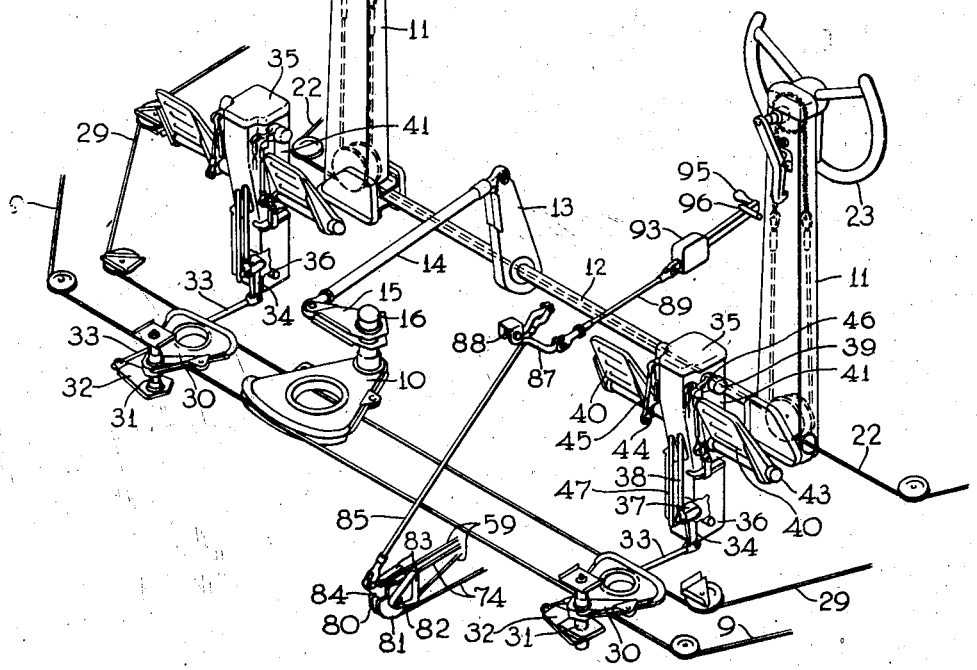
Figure 2 is an enlarged isometric diagram of the cockpit controls with interlocking mechanism.

Referring to the drawings, the elevators 1 of the airplane turn about generally horizontal hinges 2 on stabilizers 3 anchored to the tail of a fuselage 4. The elevators are operatively connected at their inner front ends through push-pull rods with a central crank arm 6 of a transverse shaft 7. Sectors 8 fast on the shaft are connected by cables 9 to a sector 10 in the cockpit operated by the steering columns 11. The steering columns are rigidly secured to a shaft 12 carrying an arm 13 which, through a link 14, arm 15 and shaft 16, is connected with the sector 10.

The ailerons 16, hinged to the wings 17, are operated through push-pull rods 18 connected to arms 19 carried on shafts 20. To each shaft 20 there are secured sectors 21 to which are attached cables 22 leading into the ends of the shaft 12 of the steering columns. By the usual system of pulleys and sprocket chains, the aileron cables are operated by the wheels 23.

The rudder 24, hinged to the fin 25 along the hinge line 26, is provided at the lower end with a shaft 27 to which sectors 28 are secured. To the sectors 28 the operating cables 29 are secured, the cables passing forward to the cockpit where they are attached to sectors 30 mounted on shafts 31. To the shafts 31 there are secured arms 32 which, by links 33 are operatively connected to arms 34 of rudder-brake operating mechanisms carried by adjustable pedestals 35. Each pedestal 35 is pivoted on a shaft 36 and the arm 34 is also pivoted to turn about the axis of the pedestal shaft 36. The arm 34 forms part of a bell crank, the other arm 37 of which is connected by a link 38 to an upper arm (not shown) fast on an upper shaft 39 mounted on the pedestal. The shaft 39 is operated conjointly by foot pedals 40 mounted on depending arms 41 turnable about the axis of shaft 39. One of the arms 41 is fast on the shaft 39 and the other is fast on a sleeve shaft 42 carried thereby and internally the shafts are connected by evener or reversing mechanism (not shown) whereby the pedals move in opposite directions when operating the rudder.

The pedals 40 also turn about their supporting pins 43 fixed to the lower ends of the arms 41 and carry arms 44 which, through links 45, are connected to arms 46 mounted on sleeve shafts turnable about the axes of shafts 39. Through links 47 the sleeve shafts, carrying suitable arms (not shown), are connected past the pedestal pivot axis 36 to brake operating mechanism (not shown). The pedestal mechanism forms the basis of another application and in the present case it is only necessary to know that some means are provided for operating the sectors 30.

Means are provided for locking the rudder in neutral position. For this purpose the rudder shaft 27 is equipped with a locking quadrant 50, here formed integrally with the quadrants 28, adapted to cooperate with a locking pin 51 mounted in a fixed guide 52. The pin is urged out of locking position by a spring 53.

The pin 51 is connected by a link 54, a lever 55, and a link 56, with an arm 57 carried by a cable pulley 58. A cable 59 is secured to the pulley 58 by a clamp 60 and passes in two lengths to certain operating mechanism in the cockpit or pilot's compartment which will be described presently.

Means are provided for locking the elevators in lowered position. When the elevators are thus locked down it is impossible to fly the airplane into the air. For this purpose one of the cable quadrants 8 on the elevator operating shaft 7 is provided with a notch 65 which in locking position receives a locking pin 66 mounted in a fixed guide 67. The pin is urged out of locking position by a spring 68.

The pin 66 is connected by a link 69, a lever 70, and a link 71, with an arm 72 carried by a cable pulley 73. A cable 74 is secured to the pulley 73 by a clamp 75 and passes in two lengths to certain operating mechanism in the cockpit or pilot's compartment which will be described presently.

The locking pin operating cables, 59 for the rudder and 74 for the elevators, extend to a point in or adjacent the pilot's compartment and are there clamped to cable pulleys 80 and 81, respectively, which are carried by a shaft 82 supported on fixed brackets 83.

To the pulley shaft 82 or to the two pulleys carried thereby, there is secured an operating arm 84 and to the arm there is pivoted a link rod 85. The other end of the link rod 85 is connected to one arm of a bell crank lever 87 which is pivoted on a pin 88. The other arm of the bell crank lever 87 is connected to a link rod 89 which at its other end is pivoted to the end of a slidable, swingable latch bar 90 mounted between roller guides 91 and resting upon a roller support 92 when not in use. The rollers of the guides 91 and the support 92 are carried by a fixed bracket 93.

The latch bar 90 is operated by a hand knob 95 and is provided with a latch pin 96 adapted to be caught behind the hook 97 of a latch lever 98 pivoted on the control column 11 at 99. It will be seen that when the pilot pulls the knob 95 toward him and raises it up, the latch pin 96 will be placed in a position to be engaged by the latch hook 97. If the hook is in proper position, it will engage the pin.

The latch lever 98 is pivoted by its pin 99 upon a bracket 100 secured to the control column and the portion above the pivot is pressed away from the column by a spring 101. A stop 102 limits the movement of the lever under the influence of the spring.

The upper end of the lever is provided with a groove 103, for example by the flanges 104 on the sides, and the end of the shaft 105 of the aileron control wheel 23 fits in this groove. A pin 106 of shaft 105 also enters the groove 103 when it is aligned therewith and in its lower position. A reduced tip 107 on the end of the shaft 31 is adapted to enter an aperture in the latch lever 98 when the stop pin 106 drops into the shaft groove.

From this it will be seen that when the control column 11 is in its full forward position to place the elevators in their lowermost position and when the wheel 23 is in its mid-position to place the ailerons in neutral position, the latch hook 98 is sufficiently far forward to permit the latch pin 96 to be pulled forward to the limit of its travel and to be pushed up behind the latch hook. The latch pin can be pulled forward to latching position when the locking pins 51 and 66 enter their respective notches in the quadrant elements 50 and 8; and this is possible only when the quadrants are in proper position, that is, when the rudder is in neutral position and the elevators are in their lowermost position.

While one embodiment of the invention has been described for purposes of illustration, it is to be understood that the invention may have various embodiments within the limits of the prior art and the scope of the subjoined claims.

What is claimed is:

1. Locking mechanism for airplane control surfaces comprising in combination, a control column for operating one control surface, a control shaft mounted on said control column for operating another control surface, lock means for the control surfaces, operating means for at least some of said locking means located near said control column, and interlocking means interacting between said column, control shaft, and lock operating means to interlock them when the control surfaces, control column, control shaft, locking means, and operating means are in locked position.

2. Locking mechanism for airplane elevator and aileron control surfaces comprising in combination, an elevator and an aileron each having a support shaft, a control column for operating the elevator and having mounted thereon an aileron operating shaft, locking means for the elevator shaft and aileron operating shaft, operating means for the elevator shaft locking means located near said control column, and latch means interacting between said column, aileron operating shaft, and lock operating means for latching said elevator support shaft, aileron operating shaft, column, and lock operating means in a predetermined locked position.

3. Locking mechanism for airplane elevator and aileron control surfaces comprising in combination, an elevator and an aileron each having a support shaft a control column for operating the elevator and having mounted thereon an aileron operating shaft, locking means for the elevator shaft and aileron operating shaft, operating means for the elevator shaft locking means located near said control column, and latch means interacting between said column, aileron operating shaft, and lock operating means for latching said elevator support shaft, aileron operating shaft, column, and lock operating means in a predetermined locked position, said elevator being locked in its lowermost position and said aileron being locked in its neutral position.

4. Locking means for a plurality of airplane control surfaces comprising in combination, operating means in the cockpit for a plurality of control surfaces, locking means located in part in the cockpit and in part adjacent at least some of the control surfaces remote from the cockpit for locking the control surfaces, means disposed in the cockpit for operating the remote locking means, and interlocking means interacting between said operating means for the locking means which is located at the control surface and the control operating means and the locking means which is located in the cockpit for insuring conjoint locking of all the controls and at least part of the control operating means when in a predetermined position.

5. Locking mechanism for airplane elevator, rudder and aileron control surfaces comprising in combination, a control column comprising means for operating the ailerons and elevators of the airplane, control means for the rudder, an operating shaft and a locking element therefor each for the aileron operating means, elevators and rudder, an operating device adjacent said control column for certain of said locking elements, and interengaging latch means on said column and element operating device which are engageable to hold the column and element operating device in locked position when the shafts, locking elements, control column, and element operating device are in locking position.

6. Locking mechanism for airplane elevator, rudder and aileron control surfaces comprising in combination, a control column comprising means for operating the aileron and elevator of the airplane, control means for the rudder, an operating shaft and a locking element therefor each for the elevator and rudder, an operating device adjacent said control column for certain of said locking elements, and interengaging latch means on said column and element operating device which is engageable to hold the column and element operating device in locked position when the shafts, locking elements, control column, and element-operating device are in locking position, said control column operating means including an aileron operating shaft having a holding element thereon, and said latch means including a latch lever mounted on said column and having a hook for engaging a pin on said locking element-operating device and a groove to receive said holding element when the column and the aileron shaft thereon are in a predetermined position.

THEODORE G. LINNERT.